United States Patent
Nakao et al.

(10) Patent No.: US 11,444,490 B2
(45) Date of Patent: Sep. 13, 2022

(54) NON-CONTACT POWER FEEDING DEVICE

(71) Applicant: OMRON Corporation, Kyoto (JP)

(72) Inventors: Goro Nakao, Inazawa (JP); Yusuke Kawai, Ichinomiya (JP); Kenichi Tabata, Ichinomiya (JP); Atsushi Nomura, Ichinomiya (JP); Takahiro Takeyama, Ichinomiya (JP); Masanobu Nakajo, Nagoya (JP)

(73) Assignee: OMRON Corporation, Kyoto (JP)

( * ) Notice: Subject to any disclaimer, the term of this patent is extended or adjusted under 35 U.S.C. 154(b) by 0 days.

(21) Appl. No.: 17/286,566

(22) PCT Filed: Oct. 16, 2019

(86) PCT No.: PCT/JP2019/040757
§ 371 (c)(1),
(2) Date: Apr. 19, 2021

(87) PCT Pub. No.: WO2020/095643
PCT Pub. Date: May 14, 2020

(65) Prior Publication Data
US 2022/0123592 A1    Apr. 21, 2022

(30) Foreign Application Priority Data
Nov. 6, 2018   (JP) .............................. JP2018-209206

(51) Int. Cl.
*H02J 50/12*   (2016.01)
*H04B 5/00*    (2006.01)

(52) U.S. Cl.
CPC ............ *H02J 50/12* (2016.02); *H04B 5/0037* (2013.01); *H04B 5/0081* (2013.01)

(58) Field of Classification Search
CPC ...... H02J 50/12; H04B 5/0037; H04B 5/0081
See application file for complete search history.

(56) References Cited

U.S. PATENT DOCUMENTS

| 3,739,285 A  | * | 6/1973  | Hepp  | H04B 1/1661 |
|              |   |         |       | 455/296     |
| 10,797,528 B2| * | 10/2020 | Nakao | H02J 50/40  |

(Continued)

FOREIGN PATENT DOCUMENTS

| CN | 104079076 A  | * | 10/2014 |
| JP | 2014-217120 A |   | 11/2014 |

(Continued)

OTHER PUBLICATIONS

English translation of the International Search Report ("ISR") of PCT/JP2019/040757 dated Dec. 10, 2019.
Written Opinion("WO") of PCT/JP2019/040757 dated Dec. 10, 2019.

*Primary Examiner* — Pinping Sun
(74) *Attorney, Agent, or Firm* — Metrolex IP Law Group, PLLC

(57) ABSTRACT

A power transmission device of a non-contact power feeding device according one or more embodiments may include a control circuit configured to control at least one of a switching frequency or a voltage of AC power supplied from a power supply circuit to a transmission coil, on the basis of a change over time in a strength of a magnetic field detected by a magnetic field detection element configured to detect a strength of a magnetic field generated from the transmission coil of the power transmission device. Whereas, a power reception device has a resonant circuit having a reception coil configured to receive electric power from the power transmission device and a resonance suppression coil arranged to be capable of being electromagnetically coupled to the reception coil.

7 Claims, 8 Drawing Sheets

(56) References Cited

U.S. PATENT DOCUMENTS

| | | | | |
|---|---|---|---|---|
| 11,171,516 | B2* | 11/2021 | Nomura | H02J 50/12 |
| 2006/0209576 | A1* | 9/2006 | Yasumura | H02M 3/3385 |
| | | | | 363/22 |
| 2009/0067207 | A1* | 3/2009 | Nishino | B60L 5/005 |
| | | | | 363/126 |
| 2014/0091787 | A1* | 4/2014 | Hyodo | H02J 50/402 |
| | | | | 324/236 |
| 2015/0028691 | A1* | 1/2015 | Yamauchi | H02J 50/90 |
| | | | | 307/104 |
| 2016/0141885 | A1* | 5/2016 | Tsuda | H02J 50/12 |
| | | | | 307/104 |
| 2016/0218559 | A1* | 7/2016 | Mehas | H02J 50/60 |
| 2017/0240056 | A1* | 8/2017 | Elshaer | B60L 53/122 |
| 2018/0143223 | A1* | 5/2018 | Taya | H02J 7/007192 |
| 2020/0083748 | A1* | 3/2020 | Nakao | H02J 5/005 |

FOREIGN PATENT DOCUMENTS

| | | | |
|---|---|---|---|
| JP | 2014217120 A | * | 11/2014 |
| JP | 2015065724 A | * | 4/2015 |
| JP | 2017-229207 A | | 12/2017 |
| JP | 2015-65724 A | | 9/2018 |
| JP | 6390808 B1 | | 9/2018 |

* cited by examiner

NON-CONTACT POWER FEEDING DEVICE

TECHNICAL FIELD

The present invention relates to a non-contact power feeding device.

BACKGROUND ART

Conventionally, there has been studied so-called non-contact power feeding (also called wireless power feeding) technology, in which electric power is transmitted through space without using a metal contact point or the like.

In a power feeding device using non-contact power supply technology (hereinafter, simply referred to as a non-contact power feeding device), when a positional relationship between a coil on a primary side (a power transmission side) and a coil on a secondary side (a power reception side) fluctuates, a coupling degree between the two coils changes. As a result, an output voltage from a device of the power reception side to a load circuit also fluctuates. Therefore, a technique for keeping the output voltage constant has been proposed (see, for example, Patent Documents 1 and 2).

For example, Patent Document 1 proposes transmitting, by a power reception device to a power transmission device through communication, a signal including determination information indicating whether or not a measured value of an output voltage from a resonant circuit is within a predetermined allowable range, and referring to, by the power transmission device, the determination information to control a switching frequency and a voltage of AC power supplied to a transmission coil. Further, Patent Document 2 proposes providing a resonance suppression circuit including a control coil magnetically coupled to a power receiving resonance coil on the power reception side, and monitoring an output voltage to suppress a resonance operation by a method of short-circuiting and opening the control coil with a switch, to keep the output voltage to a set value or less.

Patent Document 1: Japanese Patent No. 6390808
Patent Document 2: Japanese Unexamined Patent Publication No. 2015-65724

SUMMARY

However, in the technique disclosed in Patent Document 1, in a case where communication between the power transmission device and the power reception device cannot be performed for some reason, a non-contact power feeding device may not be able to keep the output voltage from the resonant circuit of the power reception device within a certain range. Further, in the technique disclosed in Patent Document 2, the frequency and the voltage of the AC power supplied to the coil on the power transmission side are constant. Therefore, depending on a coupling degree between a coil on the power transmission side and a coil on the power reception side, a power factor may decrease at the frequency of the AC power supplied to a coil on the power transmission side. As a result, power transmission efficiency is lowered and energy loss associated with the power transmission is increased.

A non-contact power feeding device according to one or more embodiments may be capable of keeping an output voltage from a resonant circuit of a power reception device within a certain range, without using communication between a power transmission device and the power reception device.

A non-contact power feeding device according to one or more embodiments may include a power transmission device and a power reception device to which electric power is transmitted from the power transmission device in a non-contact manner. In this non-contact power feeding device, the power transmission device may include a transmission coil configured to supply electric power to the power reception device; a power supply circuit configured to supply AC power to the transmission coil and adjust at least one of a switching frequency or a voltage of AC power supplied to the transmission coil; a magnetic field detection element configured to detect a strength of a magnetic field generated from the transmission coil; and a control circuit configured to control at least one of a switching frequency or a voltage of AC power supplied from the power supply circuit to the transmission coil, based on a change over time in a strength of the magnetic field detected by the magnetic field detection element. The power reception device may include a resonant circuit having a reception coil configured to receive electric power from the power transmission device, and a resonant capacitor connected in series with the reception coil; a rectifier circuit configured to rectify electric power received via the resonant circuit; and a resonance suppression coil arranged to be capable of being electro-magnetically coupled to the reception coil.

By having such a configuration, a non-contact power feeding device according to one or more embodiments may keep an output voltage from the resonant circuit of the power reception device within a certain range, without using communication between the power transmission device and the power reception device.

In this non-contact power feeding device, it may be preferable that the magnetic field detection element of the power transmission device is provided inside a winding wire on a plane orthogonal to a winding axis of the winding wire of the transmission coil.

This may enable the magnetic field detection element to accurately detect a change in a strength of a magnetic field according to a change in a resonance condition of the resonant circuit of the power reception device.

In this case, it may be preferable that the power reception device of the non-contact power feeding device further include a switch circuit connected to the resonance suppression coil, and configured to switch between short-circuiting and opening of the resonance suppression coil; a voltage detection circuit configured to measure an output voltage of electric power outputted from the rectifier circuit to obtain a measured value of the output voltage; and a determination circuit configured to control the switch circuit to short-circuit the resonance suppression coil when a measured value of the output voltage reaches equal to or larger than a first upper-limit threshold value, and control the switch circuit to open the resonance suppression coil when a measured value of the output voltage reaches equal to or lower than a first lower-limit threshold value that is lower than the first upper-limit threshold value.

This may allow the non-contact power feeding device to suppress an excessive increase in the output voltage due to a fluctuation in a coupling degree between the transmission coil and the reception coil, and prevent a failure of the power reception device and the load circuit connected to the power reception device.

Alternatively, it may be preferable that the rectifier circuit of the power reception device of the non-contact power feeding device has a smoothing capacitor configured to smooth a voltage outputted from the rectifier circuit. Further, it may be preferable that the power reception device further has: a second rectifier circuit connected between the resonance suppression coil and the smoothing capacitor, and configured to output electric power according to a voltage generated in the resonance suppression coil to the smoothing capacitor, when a voltage obtained by rectifying a voltage generated in the resonance suppression coil is higher than a voltage between both terminals of the smoothing capacitor.

This may allow the non-contact power feeding device to suppress an excessive increase in a voltage generated in the resonant circuit of the power reception device.

In addition, it may be preferable that the control circuit of the power transmission device of the non-contact power feeding device controls a voltage of AC power supplied from the power supply circuit to the transmission coil so as to lengthen a fluctuation cycle of a strength of the magnetic field detected by the magnetic field detection element.

This may allow the non-contact power feeding device to improve power transmission efficiency since it is possible to shorten a period during which a resonance condition of the resonant circuit is a condition that lowers the power transmission efficiency.

In this case, it may be preferable that the control circuit of the power transmission device searches for a switching frequency, at which a fluctuation cycle of a strength of the magnetic field becomes minimum, of AC power supplied from the power supply circuit to the transmission coil. Further, it may be preferable that the control circuit controls a voltage of the AC power supplied from the power supply circuit to the transmission coil so as to lengthen a fluctuation cycle of a strength of the magnetic field when AC power with a switching frequency at which a fluctuation cycle of a strength of the magnetic field becomes minimum is supplied to the transmission coil.

This may allow the non-contact power feeding device to further improve the power transmission efficiency, since it may be possible to reduce, in a fluctuation cycle of a strength of the magnetic field, a ratio of a period during which the resonance condition of the resonant circuit is a condition that lowers the power transmission efficiency, such as that the resonance suppression coil is short-circuited.

Alternatively, it may be preferable that the control circuit of the power transmission device of the non-contact power feeding device controls a switching frequency of AC power supplied from the power supply circuit to the transmission coil so as to lengthen a fluctuation cycle of a strength of the magnetic field detected by the magnetic field detection element.

This may allow the non-contact power feeding device to improve power transmission efficiency since it is possible to shorten a period during which a resonance condition of the resonant circuit is a condition that lowers the power transmission efficiency.

Further, when power supply from the power transmission device to the power reception device is started, or in a case where a length of a period during which the resonance suppression coil is opened is longer than a predetermined period, it may be preferable that the determination circuit of the power reception device of the non-contact power feeding device controls the switch circuit to short-circuit the resonance suppression coil when a measured value of an output voltage becomes equal to or larger than a second upper-limit threshold that is lower than the first upper-limit threshold value, and the determination circuit controls the switch circuit to open the resonance suppression coil when a measured value of the output voltage becomes equal to or lower than a second lower-limit threshold value that is lower than the second upper-limit threshold value.

This may allow the non-contact power feeding device to make it possible to short-circuit the resonance suppression coil even when the output voltage is low, and to search for a switching frequency and a voltage at which the transmission coil can efficiently transmit electric power.

DETAILED DESCRIPTION

Hereinafter, a non-contact power feeding device according to one or more embodiments are described with reference to the drawings. In this non-contact power feeding device, a device on a power reception side (hereinafter, simply referred to as a power reception device) has: a reception coil for power reception; and a coil for resonance suppression (hereinafter, simply referred to as a resonance suppression coil) provided to be capable of being electromagnetically coupled to the reception coil. Then, when an output voltage from a resonant circuit including the reception coil becomes equal to or larger than a predetermined threshold value, the power reception device short-circuits the resonance suppression coil and changes a resonance condition of the resonant circuit. Whereas, a device on a power transmission side (hereinafter, simply referred to as a power transmission device) has a magnetic field detection element configured to detect a strength of a magnetic field according to a current flowing through a transmission coil that is electromagnetically coupled to the reception coil to transmit electric power to the power reception device, and the power transmission device estimates a timing at which the resonance suppression coil has been short-circuited or opened on the basis of a change over time in a strength of the magnetic field detected by the magnetic field detection element. Then, the power transmission device controls a frequency and a voltage of AC power supplied to the transmission coil to shorten a cycle from opening of the resonance suppression coil to when the resonance suppression coil is short-circuited and then opened again, and to increase a ratio of a period during which the resonance suppression coil is opened in that cycle. This allows the non-contact power feeding device to improve the power transmission efficiency while keeping the output voltage from the resonant circuit of the power reception device within a certain range, without using communication between the power transmission device and the power reception device.

Figure 1:
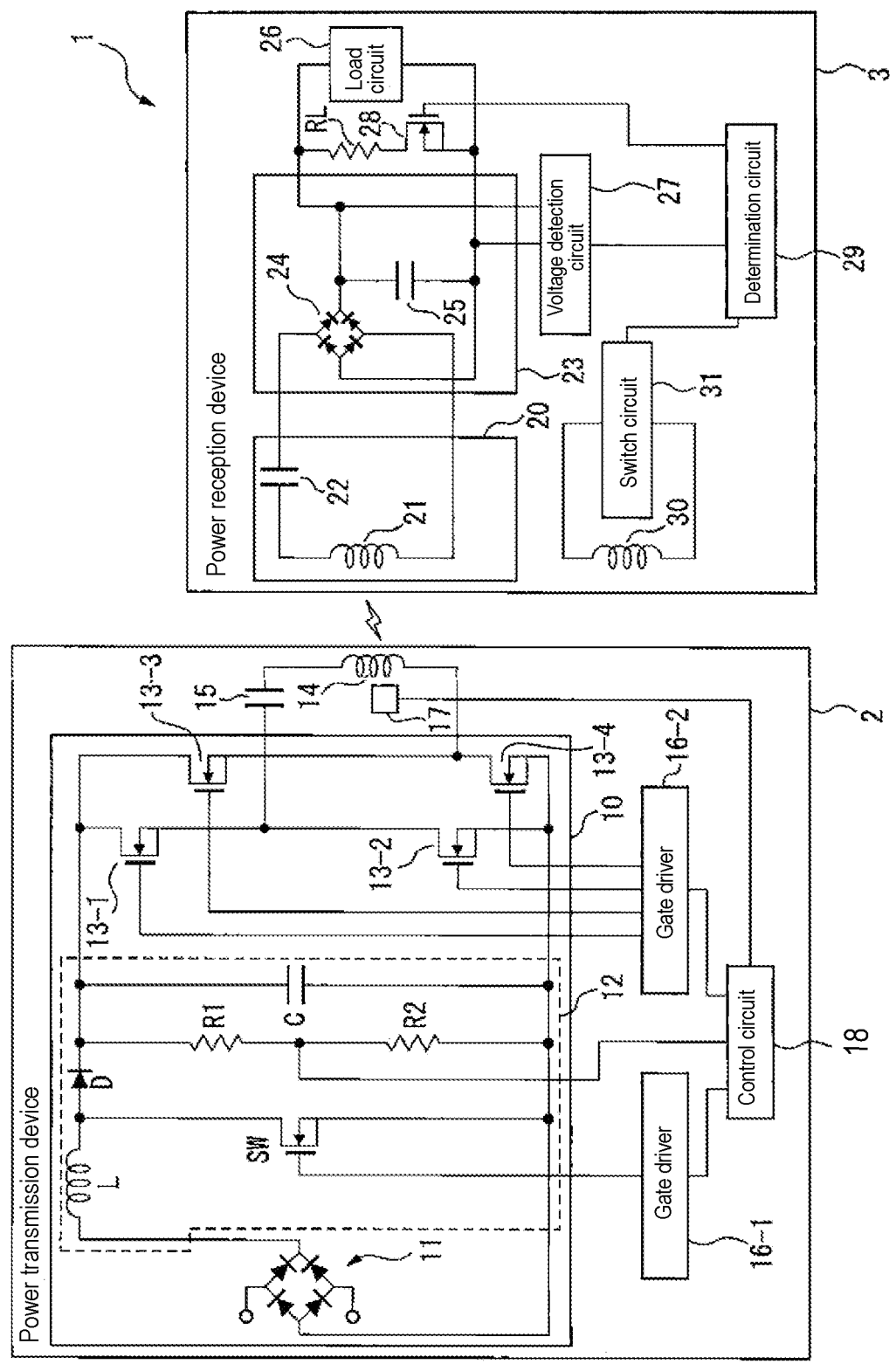
FIG. 1 is a schematic configuration diagram of a non-contact power feeding device according to one or more embodiments.

FIG. 1 is a schematic configuration diagram of a non-contact power feeding device according to one embodiment of the present invention. As shown in FIG. 1, a non-contact power feeding device 1 has a power transmission device 2, and a power reception device 3 to which electric power is transmitted from the power transmission device 2 in a non-contact manner via space. The power transmission device 2 includes a power supply circuit 10, a transmission coil 14, a capacitor 15, gate drivers 16-1 and 16-2, a magnetic field detection element 17, and a control circuit 18. Whereas, the power reception device 3 includes a resonant circuit 20 having a reception coil 21 and a resonant capacitor 22, a rectifier smoothing circuit 23, a load circuit 26, a voltage detection circuit 27, a switching element 28, a determination circuit 29, a resonance suppression coil 30, and a switch circuit 31. The non-contact power feeding device 1 does not utilize resonance on the power transmission side, but can perform a constant voltage output operation since the non-contact power feeding device 1 has a configuration similar to that of a so-called primary series secondary series capacitor system (hereinafter referred to as an SS system).

First, the power transmission device 2 will be described.

The power supply circuit 10 supplies AC power having an adjustable switching frequency and an adjustable voltage, to the transmission coil 14. For this purpose, the power supply circuit 10 includes a power source 11, a power-factor improving circuit 12, and four switching elements 13-1 to 13-4.

The power source 11 supplies electric power having a predetermined pulsating voltage. For this purpose, the power source 11 is connected to a commercial AC power source, and has a full-wave rectifier circuit for rectification of AC power supplied from the AC power source.

The power-factor improving circuit 12 converts a voltage of electric power outputted from the power source 11 into a voltage according to control from the control circuit 18, and outputs the voltage. For this purpose, the power-factor improving circuit 12 has, for example: a coil L and a diode D that are sequentially connected in series from a positive electrode side terminal of the power source 11; a switching element SW that is an n-channel MOSFET in which a drain terminal is connected between the coil L and the diode D and a source terminal is connected to a negative electrode side terminal of the power source 11; and a smoothing capacitor C that is connected in parallel with the switching element SW with the diode D interposed in between. Further, a gate terminal of the switching element SW is connected to the gate driver 16-1. Moreover, the power-factor improving circuit 12 has two resistors R1 and R2 connected in series between the positive electrode side terminal and the negative electrode side terminal of the power source 11. The resistors R1 and R2 are connected in parallel with the smoothing capacitor C, between the diode D and the smoothing capacitor C. Then, a voltage between the resistor R1 and the resistor R2 is measured by the control circuit 18 as representing a voltage outputted from the diode D.

By the gate driver 16-1 controlling on/off of the switching element SW in accordance with a duty ratio instructed by the control circuit 18 such that a locus of a current waveform outputted from the diode D matches a locus of a voltage supplied from the power source 11, the power-factor improving circuit 12 executes a power factor improving operation. Then, as the duty ratio at which the switching element SW is turned on is higher, the voltage outputted from the diode D becomes higher.

The voltage outputted from the diode D is smoothed by the smoothing capacitor C, and supplied to the transmission coil 14 via four switching elements 13-1 to 13-4.

Note that the power-factor improving circuit 12 is not limited to the above configuration, and may have another configuration in which the output voltage can be adjusted by control from the control circuit 18.

The four switching elements 13-1 to 13-4 can be, for example, n-channel MOSFETs. Then, among the four switching elements 13-1 to 13-4, the switching element 13-1 and the switching element 13-2 are connected in series between the positive electrode side terminal and the negative electrode side terminal of the power source 11 via the power-factor improving circuit 12. Further, in the embodiment, the switching element 13-1 is connected to the positive electrode side of the power source 11, while the switching element 13-2 is connected to the negative electrode side of the power source 11. Then, a drain terminal of the switching element 13-1 is connected to the positive electrode side terminal of the power source 11 via the power-factor improving circuit 12, and a source terminal of the switching element 13-1 is connected to a drain terminal of the switching element 13-2. Further, a source terminal of the switching element 13-2 is connected to the negative electrode side terminal of the power source 11 via the power-factor improving circuit 12. Moreover, the source terminal of the switching element 13-1 and the drain terminal of the switching element 13-2 are connected to one end of the transmission coil 14, and a source terminal of the switching element 13-2 is connected to another end of the transmission coil 14 via the switching element 13-4.

Similarly, among the four switching elements 13-1 to 13-4, the switching element 13-3 and the switching element 13-4 are connected in parallel with the switching element 13-1 and the switching element 13-2, and in series between the positive electrode side terminal and the negative electrode side terminal of the power source 11 via the power-factor improving circuit 12. Further, the switching element 13-3 is connected to the positive electrode side of the power source 11, while the switching element 13-4 is connected to the negative electrode side of the power source 11. Then, a drain terminal of the switching element 13-3 is connected to the positive electrode side terminal of the power source 11 via the power-factor improving circuit 12, and a source terminal of the switching element 13-3 is connected to a drain terminal of the switching element 13-4. Further, a source terminal of the switching element 13-4 is connected to the negative electrode side terminal of the power source 11 via the power-factor improving circuit 12. Moreover, the source terminal of the switching element 13-3 and the drain terminal of the switching element 13-4 are connected to another end of the transmission coil 14.

Further, the gate terminal of each of the switching elements 13-1 to 13-4 is connected to the control circuit 18 via the gate driver 16-2. Moreover, each gate terminal of each of the switching elements 13-1 to 13-4 may be connected to a source terminal of the own switching element via a resistor, in order to ensure that the switching element is turned on when a voltage to be turned on is applied. Then, each of the switching elements 13-1 to 13-4 is switched on/off at an adjustable switching frequency in accordance with a control signal from the control circuit 18. In the embodiment, a set of the switching element 13-1 and the switching element 13-4 and a set of the switching element 13-2 and the switching element 13-3 are alternately turned on/off such that the switching element 13-2 and the switching element 13-3 are turned off while the switching element 13-1 and the switching element 13-4 are turned on, and conversely, the switching element 13-1 and the switching element 13-4 are turned off while the switching element 13-2 and the switching element 13-3 are turned on. This causes DC power supplied from the power source 11 via the power-factor improving circuit 12 to be converted into AC power having a switching frequency of each of the switching elements, and supplied to the transmission coil 14.

The transmission coil 14 has, for example, a projecting core, a pot core, or a planar core to which the magnetic field detection element 17 is attached, and a winding wire wound around such a core. Then, the transmission coil 14 transmits the AC power supplied from the power supply circuit 10 to the resonant circuit 20 of the power reception device 3 via space.

The capacitor 15 is connected in series with the transmission coil 14, and cuts off a DC current flowing through the transmission coil 14. Note that a capacitance of the capacitor 15 is preferably set such that a resonance frequency of the resonant circuit formed by the transmission coil 14 and the capacitor 15 is different from a frequency included in an adjustment range of a switching frequency of AC power supplied from the power supply circuit 10 to the transmission coil 14, that is, the resonant circuit formed by the transmission coil 14 and the capacitor 15 does not resonate with the AC power supplied from the power supply circuit 10 to the transmission coil 14. Further, the capacitor 15 may be omitted.

The gate driver 16-1 receives, from the control circuit 18, a control signal for switching on/off of the switching element SW of the power-factor improving circuit 12, and changes a voltage to be applied to the gate terminal of the switching element SW in accordance with the control signal. That is, when the gate driver 16-1 receives a control signal for turning on the switching element SW, the gate driver 16-1 applies a relatively high voltage for turning on the switching element SW to the gate terminal of the switching element SW. Whereas, when the gate driver 16-1 receives a control signal for turning off the switching element SW, the gate driver 16-1 applies a relatively low voltage for turning off the switching element SW to the gate terminal of the switching element SW. This causes the gate driver 16-1 to switch on/off of the switching element SW of the power-factor improving circuit 12 at a timing instructed by the control circuit 18.

The gate driver 16-2 receives, from the control circuit 18, a control signal for switching on/off of each of the switching elements 13-1 to 13-4, and changes a voltage to be applied to the gate terminal of each of the switching elements 13-1 to 13-4 in accordance with the control signal. That is, when the gate driver 16-2 receives a control signal for turning on the switching element 13-1 and the switching element 13-4, the gate driver 16-2 applies a relatively high voltage for turning on the switching element 13-1 and the switching element 13-4 to the gate terminal of the switching element 13-1 and the gate terminal of the switching element 13-4. This causes a current from the power source 11 to flow through the switching element 13-1, the transmission coil 14, and the switching element 13-4. Whereas, when the gate driver 16-2 receives a control signal for turning off the switching element 13-1 and the switching element 13-4, the gate driver 16-2 applies a relatively low voltage to the gate terminal of the switching element 13-1 and the gate terminal of the switching element 13-4 such that the switching element 13-1 and the switching element 13-4 are turned off and a current from the power source 11 no longer flows through the switching element 13-1 and the switching element 13-4. The gate driver 16-2 also similarly controls a voltage applied to the gate terminal, for the switching element 13-2 and the switching element 13-3. Therefore, when the switching element 13-1 and the switching element 13-4 are turned off and the switching element 13-2 and the switching element 13-3 are turned on, the current from the power source 11 flows through the switching element 13-3, the transmission coil 14, and the switching element 13-2.

The magnetic field detection element 17 is, for example, a Hall element or a Hall IC, and detects a magnetic field generated by a current flowing through the transmission coil 14. Then, the magnetic field detection element 17 outputs a signal indicating a strength of the detected magnetic field to the control circuit 18.

Figure 2A:
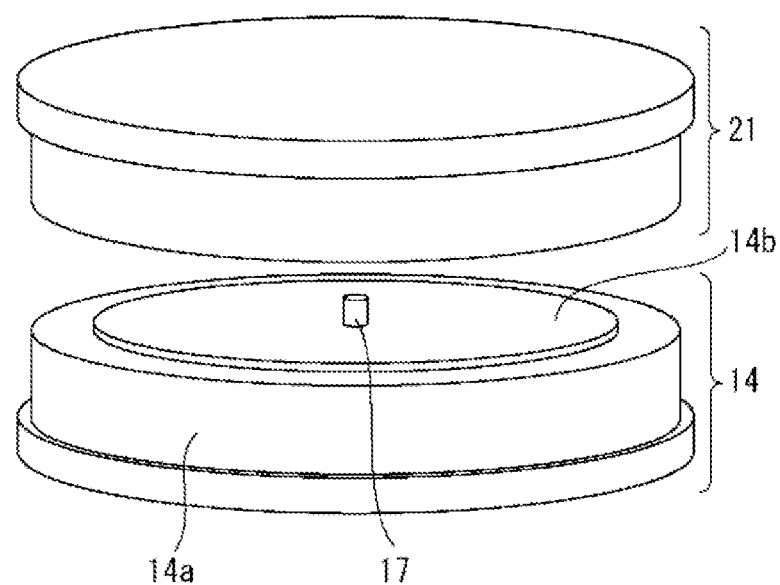
FIG. 2A is a diagram illustrating an example of a mounting position of a magnetic field detection element.
Figure 2B:
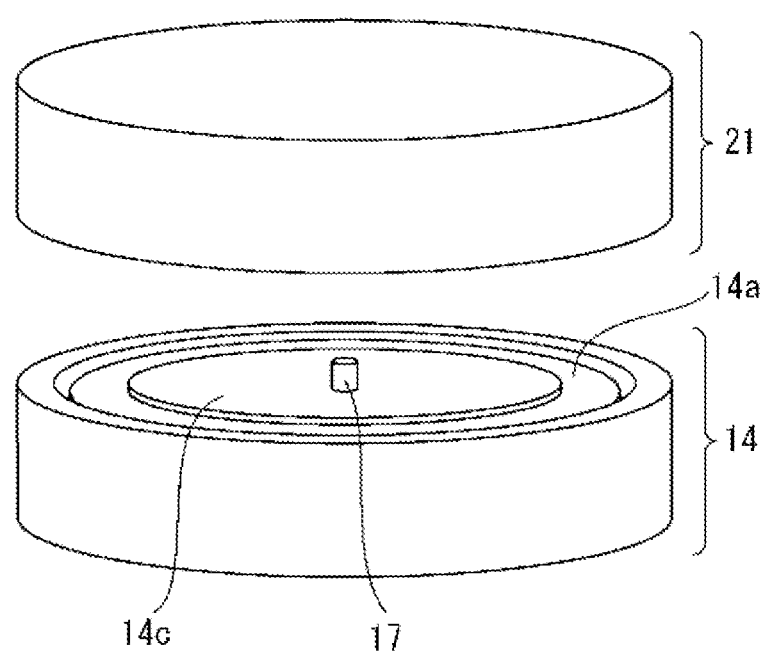
FIG. 2B is a diagram illustrating an example of a mounting position of the magnetic field detection element.

FIGS. 2A and 2B each are views showing an example of a mounting position of the magnetic field detection element 17. In the example shown in FIG. 2A, a winding wire 14a of the transmission coil 14 is wound around a projecting core 14b. Then, the magnetic field detection element 17 is attached inside the winding wire 14a, that is, a central projecting portion of the projecting core 14b around which the winding wire 14a is wound, on a surface facing the reception coil 21.

Whereas, in the example shown in FIG. 2B, the winding wire 14a of the transmission coil 14 is wound around a pot core 14c. In this case as well, the magnetic field detection element 17 is attached inside the winding wire 14a, that is, a central projecting portion of the pot core 14c around which the winding wire 14a is wound, on a surface facing the reception coil 21.

Meanwhile, a mounting position of the magnetic field detection element 17 is only required to be inside the winding wire 14a, and may be deviated from a center position of the projecting portion of the core. By attaching the magnetic field detection element 17 in this way, the control circuit 18 can easily detect a change in the magnetic field due to short-circuiting or opening of the resonance suppression coil of the power reception device 3, on the basis of a strength of the magnetic field detected by the magnetic field detection element 17.

Figure 3A:
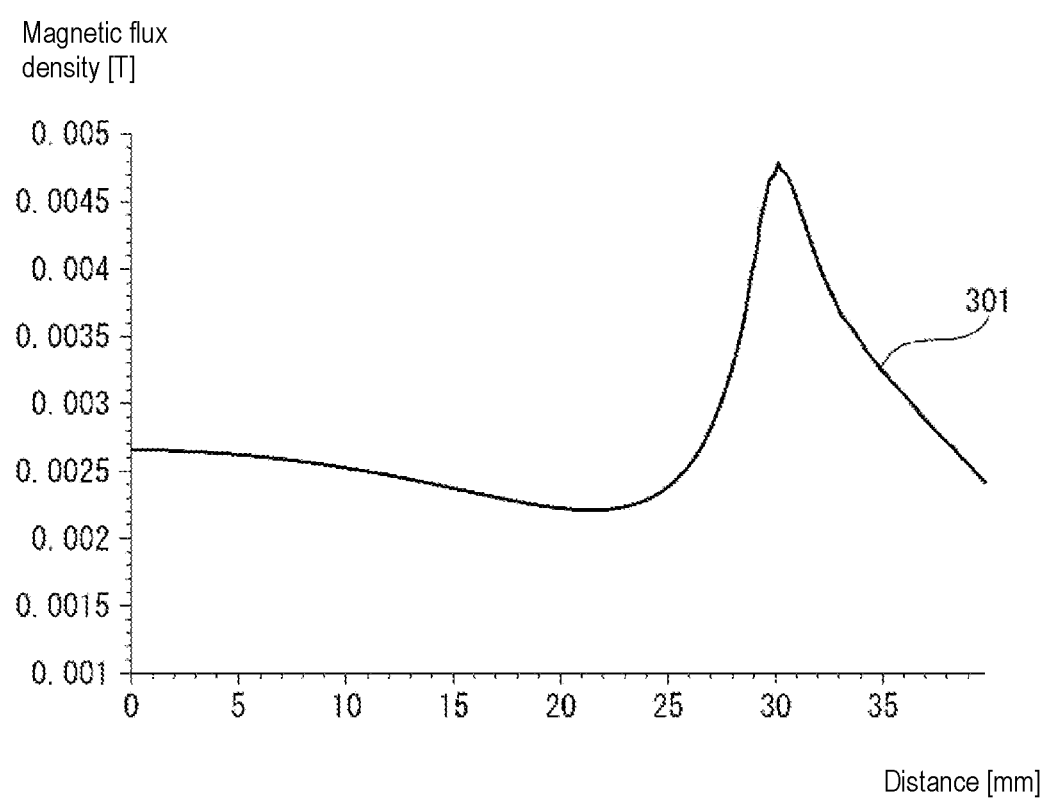
FIG. 3A is a graph illustrating a simulation result representing a relationship between a mounting position of the magnetic field detection element and a strength of a detected magnetic field when a reception coil of a power reception device is opened.
Figure 3B:
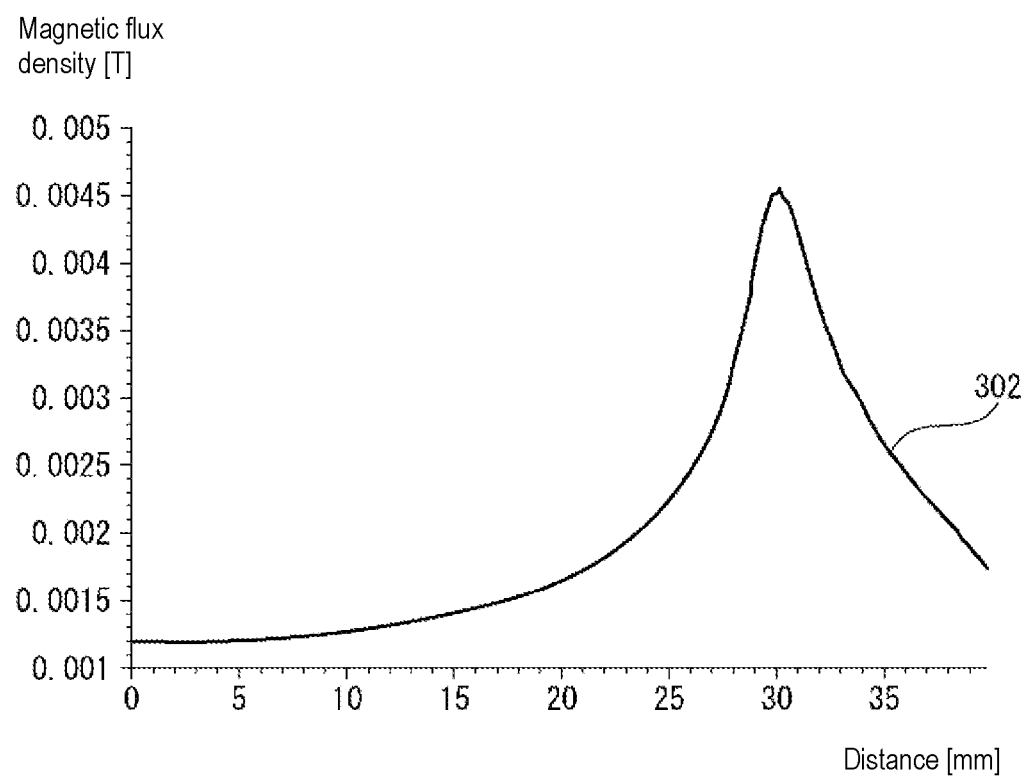
FIG. 3B is a graph illustrating a simulation result representing a relationship between a mounting position of the magnetic field detection element and a strength of a detected magnetic field when the reception coil of the power reception device is short-circuited.

FIG. 3A is a graph showing a simulation result representing a relationship between a mounting position of the magnetic field detection element 17 and a strength of a detected magnetic field when the reception coil 21 of the power reception device 3 is opened (that is, corresponding to when the resonance suppression coil 30 is opened). FIG. 3B is a graph showing a simulation result representing a relationship between a mounting position of the magnetic field detection element 17 and a strength of the detected magnetic field when the reception coil 21 of the power reception device 3 is short-circuited (that is, corresponding to when the resonance suppression coil 30 is short-circuited). In this simulation, the number of turns of the transmission coil 14 and the number of turns of the reception coil 21 were individually set to 32, and the transmission coil 14 and the reception coil 21 were arranged such that positions are 30 mm apart from each other, and centers of winding wires are coaxial with each other. Then, for each of the transmission coil 14 and the reception coil 21, a thickness was set to 2 mm and a diameter was set to 80 mm in a bottom surface of the core, that is, a surface of the core opposite to a surface of the core on which the transmission coil 14 and the reception coil 21 face each other. A thickness was set to 16 mm and a diameter was set to 60 mm in the projecting portion of the core around which the winding wire is wound. That is, a distance from a center of the projecting portion of the core to the winding wire was set to 30 mm. Further, a capacity of the resonant capacitor 22 was set to 17.14 nF, and a resistance value of the load circuit 26 was set to 6.5Ω. Moreover, a frequency and a voltage of AC power supplied to the transmission coil 14 were set to values such that the load circuit 26 consumes 200 W. Then, the magnetic field detection element 17 is arranged at a position 1 mm away toward the reception coil 21, from a surface of the projecting portion of the core of the transmission coil 14.

In FIGS. 3A and 3B, a horizontal axis represents a distance from the center of the projecting portion of the core along the surface of the projecting portion of the core, and a vertical axis represents a strength of a magnetic field (a magnetic flux density). A waveform 301 shown in FIG. 3A represents a relationship between a distance from the center of the projecting portion of the core and a strength of the detected magnetic field when the reception coil 21 is opened. Whereas, a waveform 302 shown in FIG. 3B shows a relationship between a distance from the center of the projecting portion of the core and a strength of the detected magnetic field when the reception coil 21 is short-circuited. As shown in the waveforms 301 and 302, a strength of the magnetic field detected inside the winding wire of the transmission coil 14 differs depending on whether the reception coil 21 is opened or short-circuited. Further, the difference between the strength of the magnetic field detected when the reception coil 21 is short-circuited and the strength of the magnetic field detected when the reception coil 21 is opened becomes larger as being closer to the center of the projecting portion of the core. This shows that the mounting position of the magnetic field detection element 17 is only required to be inside the winding wire on a plane orthogonal to an axis (that is, a winding axis) direction of the core around which the winding wire of the transmission coil 14 is wound, and that the mounting position is more preferable as being closer to the center of the projecting portion of the core, that is, closer to the winding axis.

The control circuit 18 includes, for example, a non-volatile memory circuit, a volatile memory circuit, an arithmetic circuit, and an interface circuit for connection to another circuit. Then, the control circuit 18 controls a switching frequency and a voltage of AC power supplied from the power supply circuit 10 to the transmission coil 14, on the basis of a change over time in a strength of the magnetic field detected by the magnetic field detection element 17.

For this purpose, in the embodiment, the control circuit 18 controls each of the switching elements 13-1 to 13-4 such that the set of the switching element 13-1 and the switching element 13-4 and the set of the switching element 13-2 and the switching element 13-3 are turned on alternately, and a period during which the set of the switching element 13-1 and the switching element 13-4 is turned on within one cycle corresponding to the switching frequency is equal to a period during which the set of the switching element 13-2 and the switching element 13-3 is turned on. Note that, when switching on/off of the set of the switching element 13-1 and the switching element 13-4 and the set of the switching element 13-2 and the switching element 13-3, the control circuit 18 may have a dead time in which both sets of the switching elements are turned off, in order to prevent short-circuit of the power source 11 due to simultaneous turning on of the set of the switching element 13-1 and the switching element 13-4 and the set of the switching element 13-2 and the switching element 13-3.

In addition, in accordance with a duty ratio that is of on/off control of the switching element SW of the power-factor improving circuit 12 and corresponds to a voltage applied to the transmission coil 14, and in accordance with a change in an output voltage from the diode D of the power-factor improving circuit 12, the control circuit 18 determines a timing for switching on/off of the switching element SW, and outputs a control signal indicating the timing to the gate driver 16-1.

Note that details of the control of the switching frequency and the voltage applied to the transmission coil 14 by the control circuit 18 will be described later.

Next, the power reception device 3 will be described.

The resonant circuit 20 is an LC resonant circuit including the reception coil 21 and the resonant capacitor 22 connected in series with each other. Then, one end of the reception coil 21 of the resonant circuit 20 is connected to one input terminal of the rectifier smoothing circuit 23 via the resonant capacitor 22. Further, another end of the reception coil 21 is connected to another input terminal of the rectifier smoothing circuit 23.

The reception coil 21 receives electric power from the transmission coil 14 by resonating with an AC current flowing through the transmission coil 14 of the power transmission device 2 together with the resonant capacitor 22. Then, the reception coil 21 outputs the received electric power to the rectifier smoothing circuit 23 via the resonant capacitor 22. Note that the number of turns of the reception coil 21 and the number of turns of the transmission coil 14 of the power transmission device 2 may be the same or different.

The resonant capacitor 22 is connected in series with the reception coil 21. That is, the resonant capacitor 22 is connected at one end to one end of the reception coil 21, and to the rectifier smoothing circuit 23 at another end. Then, the resonant capacitor 22 resonates with the reception coil 21 to output the received electric power to the rectifier smoothing circuit 23.

The rectifier smoothing circuit 23 is an example of a rectifier circuit, and has a smoothing capacitor 25 and a full-wave rectifier circuit 24 having four bridge-connected diodes. Further, the rectifier smoothing circuit 23 rectifies and smoothes electric power received by the resonant circuit 20 and received from the resonant circuit 20, to convert into DC power. Then, the rectifier smoothing circuit 23 outputs the DC power to the load circuit 26.

The voltage detection circuit 27 measures an output voltage between both terminals of the rectifier smoothing circuit 23 for each predetermined cycle. Since the output voltage between both terminals of the rectifier smoothing circuit 23 corresponds to an output voltage of the resonant circuit 20 on a one-to-one basis, a measured value of the output voltage between both terminals of the rectifier smoothing circuit 23 is indirectly to be a measured value of the output voltage of the resonant circuit 20. The voltage detection circuit 27 can be, for example, any of various known voltage detection circuits capable of detecting a DC voltage. Then, the voltage detection circuit 27 outputs a voltage detection signal representing the measured value of the output voltage, to the determination circuit 29.

The switching element 28 is, for example, a MOSFET, and is connected to the rectifier smoothing circuit 23 in series with a resistor $R_L$ connected in parallel with the load circuit 26. When the switching element 28 is turned on, a current outputted from the rectifier smoothing circuit 23 flows through the resistor $R_L$. Whereas, when the switching element 28 is turned off, a current outputted from the rectifier smoothing circuit 23 does not flow through the resistor $R_L$ but flows through the load circuit 26.

The determination circuit 29 determines whether or not a measured value of an output voltage received from the voltage detection circuit 27 is equal to or larger than a predetermined upper-limit threshold value. Then, when the measured value is equal to or larger than the upper-limit threshold value, the switch circuit 31 is controlled so as to short-circuit the resonance suppression coil 30. This allows the determination circuit 29 to immediately change a resonance frequency of the resonant circuit 20 to reduce electric power transmitted between the power transmission device 2 and the power reception device 3 when the measured value of the output voltage reaches the upper-limit threshold value, and to consequently reduce an output voltage from the resonant circuit 20. Note that the upper-limit threshold value can be an upper limit value of a voltage at which the load circuit 26 and the power reception device 3 do not fail, or a value obtained by subtracting a predetermined offset value from the upper limit value.

Further, the determination circuit 29 determines whether or not a measured value of an output voltage is equal to or less than a predetermined lower-limit threshold value. Then, when the measured value is equal to or less than the lower-limit threshold value, the switch circuit 31 is controlled so as to open the resonance suppression coil 30. This allows the determination circuit 29 to immediately restore a resonance frequency of the resonant circuit 20 to increase electric power transmitted between the power transmission device 2 and the power reception device 3 when the measured value of the output voltage drops to the lower-limit threshold value, and to consequently increase an output voltage from the resonant circuit 20. Note that the lower-limit threshold value can be a value lower than the upper-limit threshold value by a predetermined value, for example, a minimum value of a voltage that allows the load circuit 26 to operate and is determined by specifications of the load circuit 26.

Further, the determination circuit 29 turns on the switching element 28 when a period from opening of the resonance suppression coil 30 to a time when the resonance suppression coil 30 is short-circuited and then opened again becomes longer than a predetermined period. As a result, in a case where a switching frequency and a voltage of AC power supplied to the transmission coil 14 in the power transmission device 2 are not optimized, the power transmission device 2 can optimize the switching frequency and the voltage of the AC power supplied to the transmission coil 14 in a state where the resistor $R_L$ is connected with the resonant circuit 20.

For this purpose, the determination circuit 29 has, for example: a memory circuit configured to store the upper and lower-limit threshold values; an arithmetic circuit configured to compare a measured value of an output voltage with each of the upper and lower-limit threshold values; a timer circuit; and a control circuit configured to control on/off of the switching element 28 and the switch circuit 31. Note that the determination circuit 29 may have a circuit similar to a circuit used for on/off control of the control coil described in Patent Document 1, as a circuit configured to compare a measured value of an output voltage with the upper and lower-limit threshold values, to switch on/off of the switching element 28 and the switch circuit 31 in accordance with the result.

The resonance suppression coil 30 is provided to be capable of being electromagnetically coupled to the reception coil 21 of the resonant circuit 20. For example, the resonance suppression coil 30 and the reception coil 21 are wound around the same core. Further, both ends of the resonance suppression coil 30 are individually connected to the switch circuit 31. Then, when the resonance suppression coil 30 is short-circuited by the switch circuit 31, the resonance suppression coil 30 is electromagnetically coupled to the reception coil 21, and a resonance frequency of the resonant circuit 20 changes. Therefore, even if the output voltage from the resonant circuit 20 rises excessively, electric power transmitted from the power transmission device 2 to the power reception device 3 is reduced by the resonance suppression coil 30 being short-circuited, so that the output voltage from the resonant circuit 20 is also reduced. Note that the number of turns of the reception coil 21 and the number of turns of the resonance suppression coil 30 may be the same or different.

Whereas, when the switch circuit 31 opens both ends of the resonance suppression coil 30, the resonance suppression coil 30 is no longer involved in the resonance between the transmission coil 14 and the reception coil 21, and no longer affects power transmission from the power transmission device 2 to the power reception device 3.

The switch circuit 31 has, for example, a relay or a MOSFET, and is connected to both ends of the resonance suppression coil 30. Then, the switch circuit 31 switches between short-circuiting and opening of the resonance suppression coil 30 in accordance with a control signal from the determination circuit 29. That is, the switch circuit 31 short-circuits the resonance suppression coil 30 while receiving a control signal for turning on from the determination circuit 29. Whereas, the switch circuit 31 opens both ends of the resonance suppression coil 30 while receiving a control signal for turning off from the determination circuit 29.

Hereinafter, details of an operation of the non-contact power feeding device 1 will be described.

In the embodiment, the control circuit 18 of the power transmission device 2 controls a switching frequency and a voltage of AC power supplied to the transmission coil 14, on the basis of a change over time in a strength of a magnetic field measured by the magnetic field detection element 17.

Here, a frequency at which the resonant circuit 20 resonates with AC current flowing through the transmission coil 14 (hereinafter, may be simply referred to as a resonance frequency) depends on a coupling degree between the transmission coil 14 and the reception coil 21. Therefore, if the coupling degree between the transmission coil 14 and the reception coil 21 changes, the resonance frequency also changes. Then, as a switching frequency of AC power supplied to the transmission coil 14 approaches the resonance frequency, an output voltage from the resonant circuit 20 increases. Therefore, as the switching frequency of the AC power supplied to the transmission coil 14 approaches the resonance frequency, a length of a period from opening of the resonance suppression coil 30 to when the resonance suppression coil 30 is short-circuited and then the resonance suppression coil 30 is opened again becomes shorter.

Furthermore, when the output voltage from the resonant circuit 20 rises, a magnetic field generated by a current flowing through the transmission coil 14 becomes stronger as a displacement amount of the current flowing through the transmission coil 14 per unit time is larger. Then, an increase of an electric charge quantity charged in the smoothing capacitor 25 becomes slower in accordance with an elapsed time from the time when the resonance suppression coil 30 is opened. Therefore, the displacement amount of the current flowing through the transmission coil 14 per unit time becomes maximum immediately after the resonance suppression coil 30 is opened. Therefore, in a period from opening of the resonance suppression coil 30 to when the resonance suppression coil 30 is short-circuited and then the resonance suppression coil 30 is opened again, the time when a strength of the magnetic field detected by the magnetic field detection element 17 becomes maximum corresponds to a timing when the resonance suppression coil 30 is opened. Whereas, while the resonance suppression coil 30 is short-circuited, the power transmission from the transmission coil 14 to the reception coil 21 is stopped. Therefore, the current flowing through the transmission coil 14 also becomes constant, and accordingly a strength of the magnetic field detected by the magnetic field detection element 17 becomes also constant and smaller than a strength of the magnetic field when the resonance suppression coil 30 is open. Therefore, in a period from opening of the resonance suppression coil 30 to when the resonance suppression coil 30 is short-circuited and then the resonance suppression coil 30 is opened again, the time when a strength of the magnetic field detected by the magnetic field detection element 17 becomes minimum corresponds to a timing when the resonance suppression coil 30 is short-circuited. Therefore, the control circuit 18 is only required to estimate the timing at which the strength of the magnetic field detected by the magnetic field detection element 17 reaches the maximum value as the timing at which the resonance suppression coil 30 is opened, and estimate the timing at which the strength of the magnetic field detected by the magnetic field detection element 17 reaches the minimum value as the timing at which the resonance suppression coil 30 is short-circuited. In this way, the period described above corresponds to a cycle of a strength fluctuation of the magnetic field detected by the magnetic field detection element 17. Hereinafter, a cycle of the strength fluctuation of the magnetic field detected by the magnetic field detection element 17 is referred to as a magnetic field fluctuation cycle, for convenience of explanation.

Figure 4:
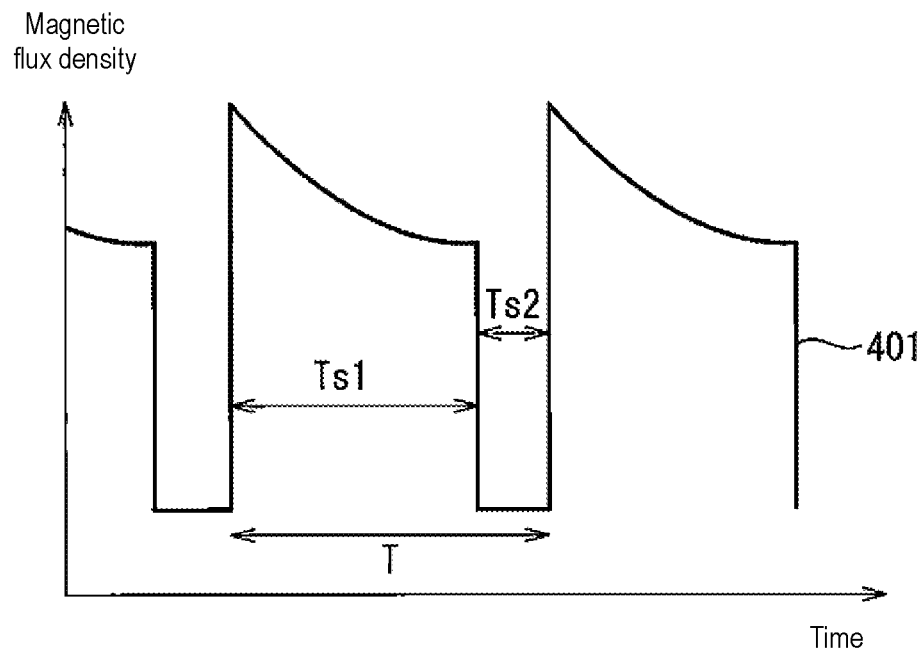
FIG. 4 is a schematic diagram illustrating an example of a relationship of a magnetic field fluctuation cycle.
Figure 4:
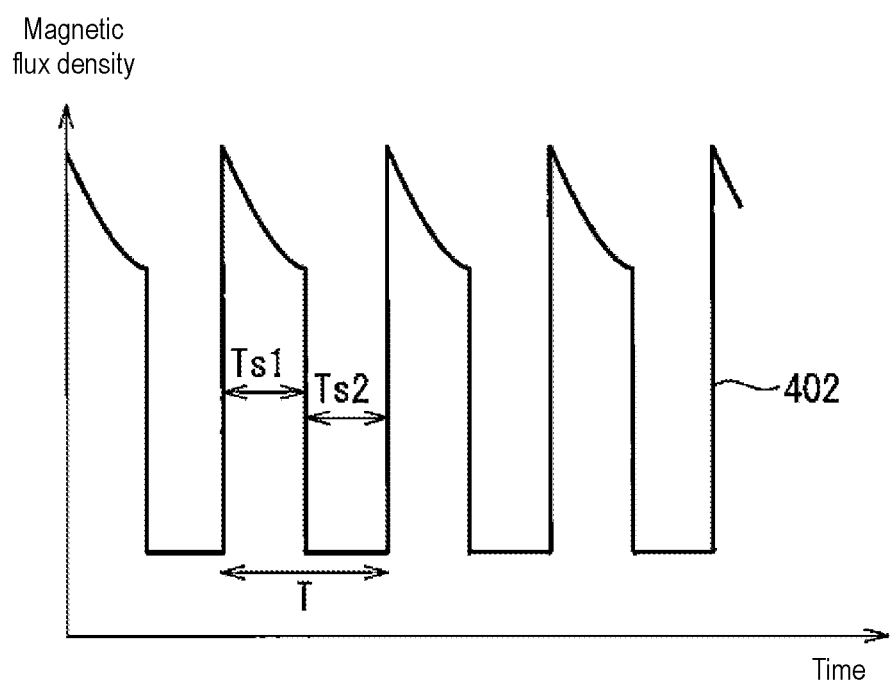

FIG. 4 is a schematic view showing an example of the magnetic field fluctuation cycle. In FIG. 4, a horizontal axis represents time and a vertical axis represents a strength of a magnetic field (a magnetic flux density). A waveform 401 represents a strength fluctuation of the magnetic field when a difference between a switching frequency of AC power supplied to the transmission coil 14 and a resonance frequency of the resonant circuit 20 is relatively large. Further, a waveform 402 represents a strength fluctuation of the magnetic field when a difference between a switching frequency of AC power supplied to the transmission coil 14 and a resonance frequency of the resonant circuit 20 is relatively small. And a period T represents a magnetic field fluctuation cycle. As shown in the waveform 401 and the waveform 402, as the difference between the switching frequency of the AC power supplied to the transmission coil 14 and the resonance frequency of the resonant circuit 20 is smaller, a magnetic field fluctuation cycle T becomes shorter. This is because, in the magnetic field fluctuation cycle T, a length of a period Ts1 from a timing when a strength of the magnetic field becomes maximum (that is, a timing when the resonance suppression coil 30 is opened) until a timing when a strength of the magnetic field becomes minimum (that is, a timing when the resonance suppression coil 30 is short-circuited) becomes shorter as the difference between the switching frequency of the AC power supplied to the transmission coil 14 and the resonance frequency of the resonant circuit 20 is smaller. Whereas, in the magnetic field fluctuation cycle T, a length of a period Ts2 during which a strength of the magnetic field is minimum (that is, a period when the resonance suppression coil 30 is short-circuited) is determined by a capacity of the smoothing capacitor 25 and a resistance value of the load circuit 26. Therefore, the period Ts2 does not depend on the difference between the switching frequency of the AC power supplied to the transmission coil 14 and the resonance frequency of the resonant circuit 20.

Further, the magnetic field fluctuation cycle T becomes shorter as a coupling degree between the transmission coil 14 and the reception coil 21 is higher, or as a voltage of the AC power supplied to the transmission coil 14 is higher. This is because an output voltage from the resonant circuit 20 also becomes higher as the coupling degree or the voltage of the AC power supplied to the transmission coil 14 is higher.

Figure 5:
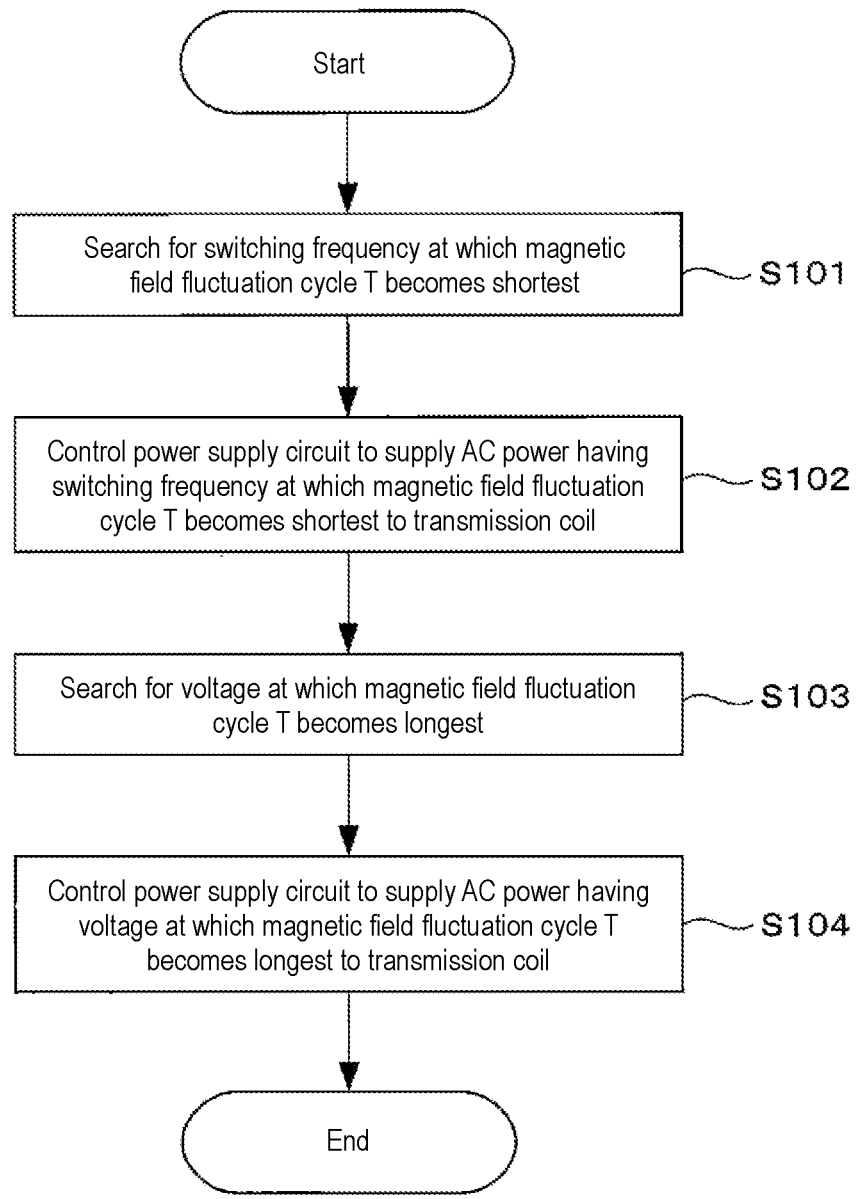
FIG. 5 is a flowchart illustrating an operation of a switching frequency and voltage control process of AC power supplied to a transmission coil.

FIG. 5 is an operation flowchart of a switching frequency and voltage control process of AC power supplied to the transmission coil 14, by the control circuit 18. The control circuit 18 controls a switching frequency and a voltage of AC power applied to the transmission coil 14 in accordance with the operation flowchart below, at a start of power supply to the power reception device 3 or for each certain period, in order to keep an output voltage from the resonant circuit 20 within a certain range.

The control circuit 18 searches for a switching frequency at which the magnetic field fluctuation cycle T becomes shortest, while controlling the power supply circuit 10 to change a switching frequency of AC power applied to the transmission coil 14 (step S101). At that time, the control circuit 18 may obtain the magnetic field fluctuation cycle T by simply detecting timings at which a strength of the magnetic field detected by the magnetic field detection element 17 becomes maximum and minimum for each switching frequency. Note that a range for adjusting the switching frequency may be simply set in advance in accordance with, for example, a range of possible values of an expected coupling degree between the transmission coil 14 and the reception coil 21. Further, an initial value of the switching frequency may simply be any frequency within the adjustment range.

When the switching frequency at which the magnetic field fluctuation cycle T becomes shortest is detected, the control circuit 18 controls the power supply circuit 10 to supply the AC power of the switching frequency to the transmission coil 14 (step S102). This allows the control circuit 18 to cause the power supply circuit 10 to supply, to the transmission coil 14, AC power having a switching frequency that matches a resonance frequency of the resonant circuit 20 according to the coupling degree between the transmission coil 14 and the reception coil 21.

Next, the control circuit 18 searches for a voltage of AC power at which a magnetic field fluctuation cycle T becomes longest, while controlling the power supply circuit 10 to change the voltage of the AC power applied to the transmission coil 14 (step S103). In this case as well, the control circuit 18 may obtain the magnetic field fluctuation cycle T by simply detecting timings at which a strength of the magnetic field detected by the magnetic field detection element 17 becomes maximum and minimum for each voltage of AC power applied to the transmission coil 14. Note that a range for adjusting the voltage may be set in advance such that a measured value of an output voltage in the power reception device 3 becomes equal to or larger than the lower-limit threshold value for each switching frequency, for example, when AC power at that switching frequency is supplied to the transmission coil 14. Further, an initial value of the voltage may be any voltage within the adjustment range.

When the voltage at which the magnetic field fluctuation cycle T becomes longest is detected, the control circuit 18 controls the power supply circuit 10 to supply the AC power of that voltage to the transmission coil 14 (step S104). This allows the control circuit 18 to maximize a ratio of the period Ts1 during which the resonance suppression coil 30 is opened in the magnetic field fluctuation cycle T. Therefore, the control circuit 18 can suppress deterioration of power transmission efficiency due to short-circuiting of the resonance suppression coil 30.

After step S104, the switching frequency and the voltage of the AC power applied to the transmission coil 14 are optimized, so that the control circuit 18 ends the switching frequency and voltage control process.

Meanwhile, as described above, the magnetic field fluctuation cycle T changes in accordance with a coupling degree between the transmission coil 14 and the reception coil 21, and in accordance with a difference between a resonance frequency of the resonant circuit 20 and a switching frequency of AC power supplied to the transmission coil 14 according to the coupling degree. That is, when the coupling degree between the transmission coil 14 and the reception coil 21 becomes smaller after the switching frequency and the voltage of the AC power applied to the transmission coil 14 are optimized, the difference between the resonance frequency and the switching frequency of the AC power applied to the transmission coil 14 also becomes large. Further, an output voltage from the resonant circuit 20 becomes lower as the coupling degree between the transmission coil 14 and the reception coil 21 is lower, and therefore the magnetic field fluctuation cycle T becomes longer. Whereas, when the coupling degree between the transmission coil 14 and the reception coil 21 increases after the switching frequency and the voltage of the AC power applied to the transmission coil 14 are optimized, an output voltage of the resonant circuit 20 may increase and the magnetic field fluctuation cycle T may become shorter.

Therefore, it is preferable that the control circuit 18 continuously measures the magnetic field fluctuation cycle T even after the switching frequency and the voltage of the AC power applied to the transmission coil 14 are optimized. Then, when the magnetic field fluctuation cycle T becomes longer than a first period threshold value or shorter than a second period threshold value (where the first period threshold value>the second period threshold value), the control circuit 18 may execute the switching frequency and voltage control process again in accordance with the operation flowchart shown in FIG. 5. As a result, even if the coupling degree between the transmission coil 14 and the reception coil 21 changes after the switching frequency and the voltage of the AC power applied to the transmission coil 14 are optimized, the control circuit 18 can optimize the switching frequency and the voltage of the AC power applied to the transmission coil 14 in accordance with the change in the coupling degree. Note that the first period threshold value may be set to a value, for example, several times the magnetic field fluctuation cycle T immediately after execution of the switching frequency and voltage control process, or a value obtained by adding a predetermined offset value to the maximum value of the magnetic field fluctuation cycle T when the switching frequency is optimized in a range of an expected coupling degree between the transmission coil 14 and the reception coil 21. Further, the second period threshold value may be, for example, a value obtained by multiplying the magnetic field fluctuation cycle T immediately after execution of the switching frequency and voltage control process by a coefficient less than 1 (for example, 0.7 to 0.9).

As described above, this non-contact power feeding device changes a resonance frequency of the resonant circuit and reduces transmitted electric power, by short-circuiting the resonance suppression coil that can be electromagnetically coupled to the reception coil in the resonant circuit when an output voltage from the resonant circuit of the power reception device becomes above the upper-limit threshold value. Whereas, the power transmission device obtains a magnetic field fluctuation cycle by detecting the timings at which the resonance suppression coil is short-circuited and opened on the basis of a change over time in a strength of the magnetic field due to a current flowing through the transmission coil, and controls a switching frequency and a voltage of AC power supplied to the transmission coil in accordance with the change in the magnetic field fluctuation cycle. Therefore, this non-contact power feeding device can prevent the output voltage from the resonant circuit from excessively rising and causing a failure of the power reception device or the load circuit without using communication between the power transmission device and the power reception device, and can improve the power transmission efficiency while keeping the output voltage from the resonant circuit of the power reception device within a certain range.

Note that, as in a case where a voltage of AC power supplied to the transmission coil 14 is too low, a measured value of an output voltage in the power reception device 3 may not reach the upper-limit threshold value for short-circuiting the resonance suppression coil 30. In such a case, the resonance suppression coil 30 is not to be short-circuited even by executing the switching frequency and voltage control process in accordance with the operation flowchart shown in FIG. 5. Therefore, the magnetic field fluctuation cycle T may become infinite, and the control circuit 18 may not be able to obtain the optimum switching frequency and voltage.

Therefore, according to a modified example, the determination circuit 29 of the power reception device 3 may store a second upper-limit threshold value and a second lower-limit threshold value, which are respectively lower than the upper and lower-limit threshold values described above. Then, when power transmission is started, or when the magnetic field fluctuation cycle T becomes longer than the first period threshold value and then the switching frequency and voltage control process is executed again, that is, when a length of a period during which the resonance suppression coil 30 is opened is equal to or longer than a predetermined length, the determination circuit 29 may control the switch circuit 31 to short-circuit the resonance suppression coil 30 when a measured value of the output voltage becomes equal to or larger than the second upper-limit threshold value, and control the switch circuit 31 to open the resonance suppression coil 30 when a measured value of the output voltage becomes equal to or less than the second lower-limit threshold value. Further, in this modified example, the determination circuit 29 may turn on the switching element 28 only while the second upper-limit threshold value and the second lower-limit threshold value are used, that is, only while the switching frequency and voltage control process is being executed.

Moreover, for example, in a case where the second upper-limit threshold value and the second lower-limit threshold value are used, when a measured value of the output voltage exceeds a switching threshold value that is higher than the second upper-limit threshold value and lower than the upper-limit threshold value, the determination circuit 29 may use the upper and lower-limit threshold values in place of the second upper and lower-limit threshold values. This is because, when AC power with the optimum switching frequency and voltage is started to be supplied to the transmission coil 14, electric power received by the power reception device 3 becomes large and the output voltage from the resonant circuit 20 becomes high.

Alternatively, the determination circuit 29 may use the upper and lower-limit threshold values in place of the second upper and lower-limit threshold values after a predetermined period has elapsed since the use of the second upper-limit threshold value and the second lower-limit threshold value has been started. In this case, the predetermined period can be, for example, a period equal to a maximum value of an expected required time for the switching frequency and voltage control process.

Meanwhile, in the above embodiment or modified example, the resistor $R_L$ and the switching element 28 may be omitted. This allows the non-contact power feeding device to continue to supply electric power to the load circuit 26 even while the switching frequency and voltage control process is being executed.

Further, according to another modified example, a resonance suppression coil 30 may be connected to a smoothing capacitor 25 via a rectifier circuit.

Figure 6:
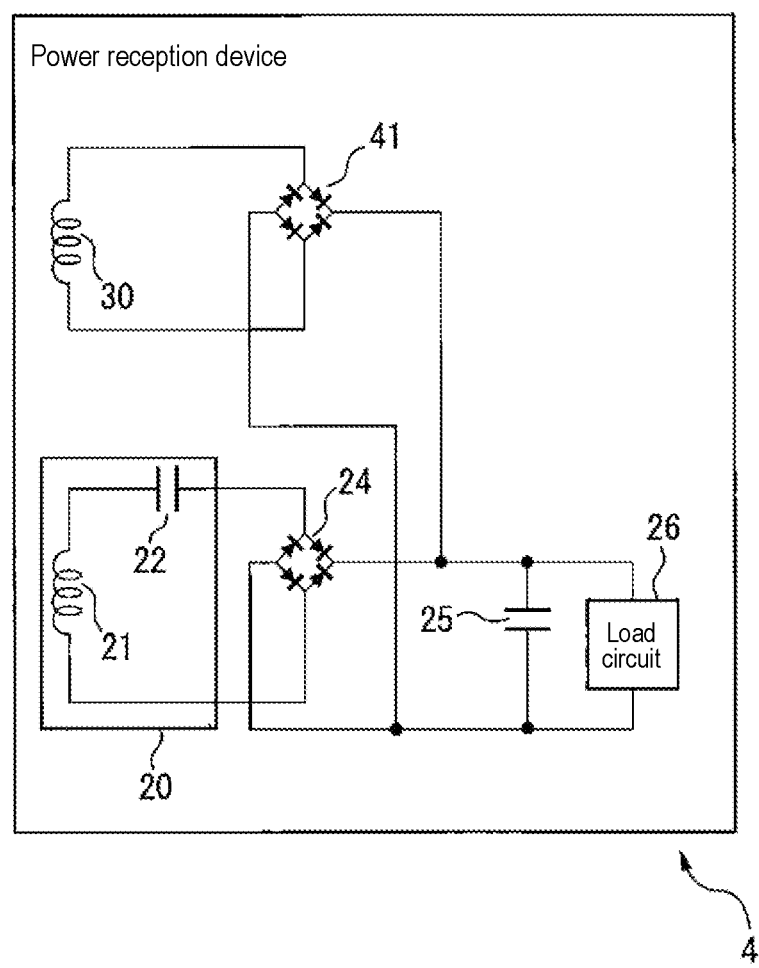
FIG. 6 is a schematic configuration diagram illustrating a power reception device according to a modified example.

FIG. 6 is a schematic configuration diagram of a power reception device according to this modified example. As compared with the power reception device 3 shown in FIG. 1, a power reception device 4 according to this modified example is different in that a rectifier circuit 41 is provided instead of the voltage detection circuit 27, the switching element 28, the determination circuit 29, and the switch circuit 31. Therefore, the rectifier circuit 41 and related parts will be described below. For other components of the power reception device 4, refer to the description of the corresponding components in the above embodiment.

Both ends of the resonance suppression coil 30 are connected to two input terminals of the rectifier circuit 41, respectively. Further, a number of turns ns of the resonance suppression coil 30 is set such that the number of turns ns of the resonance suppression coil 30 is smaller than a number of turns nm of a reception coil 21. Moreover, a ratio (nm/ns) of the number of turns nm of the reception coil 21 to the number of turns ns of the resonance suppression coil 30 is preferably set such that an expected voltage peak maximum value of the resonance suppression coil 30 is equal to or lower than an operation voltage of a load circuit 26, which is set in accordance with specifications of the load circuit 26, that is, equal to or lower than an output voltage from the smoothing capacitor 25 when the load circuit 26 is operating. As a result, for example, even in a case where AC power having a switching frequency that substantially matches a resonance frequency of the resonant circuit 20 is supplied to a transmission coil 14 when a non-contact power feeding device 1 starts power transmission, a part of the transmitted electric power flows from the resonance suppression coil 30 to the smoothing capacitor 25 via the rectifier circuit 41. Therefore, an excessive voltage being applied to the resonant circuit 20 is suppressed. Whereas, in a case where a voltage of electric power outputted from the resonant circuit 20 to the load circuit 26 via a full-wave rectifier circuit 24 and the smoothing capacitor 25 becomes a certain magnitude, a voltage between both terminals of the smoothing capacitor 25 becomes higher than a voltage between two output terminals of the rectifier circuit 41 according to a voltage applied between both terminals of the resonance suppression coil 30. Therefore, no current flows from the resonance suppression coil 30 to the smoothing capacitor 25, and the resonance suppression coil 30 does not affect resonance of the resonant circuit 20, that is, power transmission.

The rectifier circuit 41 can be, for example, a full-wave rectifier circuit having four bridge-connected diodes. Note that the rectifier circuit 41 may be a rectifier circuit of another type. One of two terminals on an input side of the rectifier circuit 41 is connected to one end of the resonance suppression coil 30, and another one of the two terminals is connected to another end of the resonance suppression coil 30. Further, one of two terminals on an output side of the rectifier circuit 41 is connected to one end of the smoothing capacitor 25, and another one of the two terminals on the output side is connected to another end of the smoothing capacitor 25. Then, when a voltage between the two terminals on the output side of the rectifier circuit 41, which is according to a voltage applied between both terminals of the resonance suppression coil 30, is higher than a voltage between both terminals of the smoothing capacitor 25, the rectifier circuit 41 outputs electric power outputted from the resonance suppression coil 30, to the smoothing capacitor 25.

In this modified example, a period during which electric power is outputted from the resonance suppression coil 30 to the smoothing capacitor 25 corresponds to a period during which the resonance suppression coil 30 is short-circuited in the above embodiment. During that period, a strength of the magnetic field detected by the magnetic field detection element 17 is substantially constant. Whereas, when electric power is no longer outputted from the resonance suppression coil 30 to the smoothing capacitor 25, a strength of the magnetic field detected by the magnetic field detection element 17 rapidly increases and the strength becomes maximum, similarly to when the resonance suppression coil 30 is opened in the above embodiment. Therefore, similarly to the above embodiment, a control circuit 18 of a power transmission device 2 may simply execute the switching frequency and voltage control process in accordance with the operation flowchart shown in FIG. 5, on the basis of a magnetic field fluctuation cycle of a strength of the magnetic field detected by the magnetic field detection element 17.

According to this modified example, the non-contact power feeding device can prevent an excessively high voltage from being applied to the resonant circuit, even in a case where no electric charge is accumulated in the smoothing capacitor, and AC power having a switching frequency that substantially matches a resonance frequency of the resonant circuit of the power reception device is supplied to the transmission coil.

Moreover, in the modified example shown in FIG. 6 as well, the power reception device 4 may have a voltage detection circuit 27, a determination circuit 29, and a switch circuit 31. Then, the determination circuit 29 may turn on the switch circuit 31 to short-circuit the resonance suppression coil 30 when a measured value of the output voltage by the voltage detection circuit 27 becomes equal to or larger than the upper-limit threshold value, and turn off the switch circuit 31 to open the resonance suppression coil 30 when a measured value of the output voltage becomes equal to or lower than the lower-limit threshold value.

Further, in order to improve the energy transmission efficiency, it is preferable that the power supply circuit 10 and the transmission coil 14 of the power transmission device 2 continuously perform a soft switching (inductive) operation. In order for the power supply circuit 10 and the transmission coil 14 to perform the soft switching operation, it is preferable that a phase of a current flowing through the transmission coil 14 is delayed from a phase of an applied voltage.

Therefore, according to still another modified example, the power transmission device may further have a phase control circuit configured to adjust a phase of a current flowing through the transmission coil 14.

Figure 7:
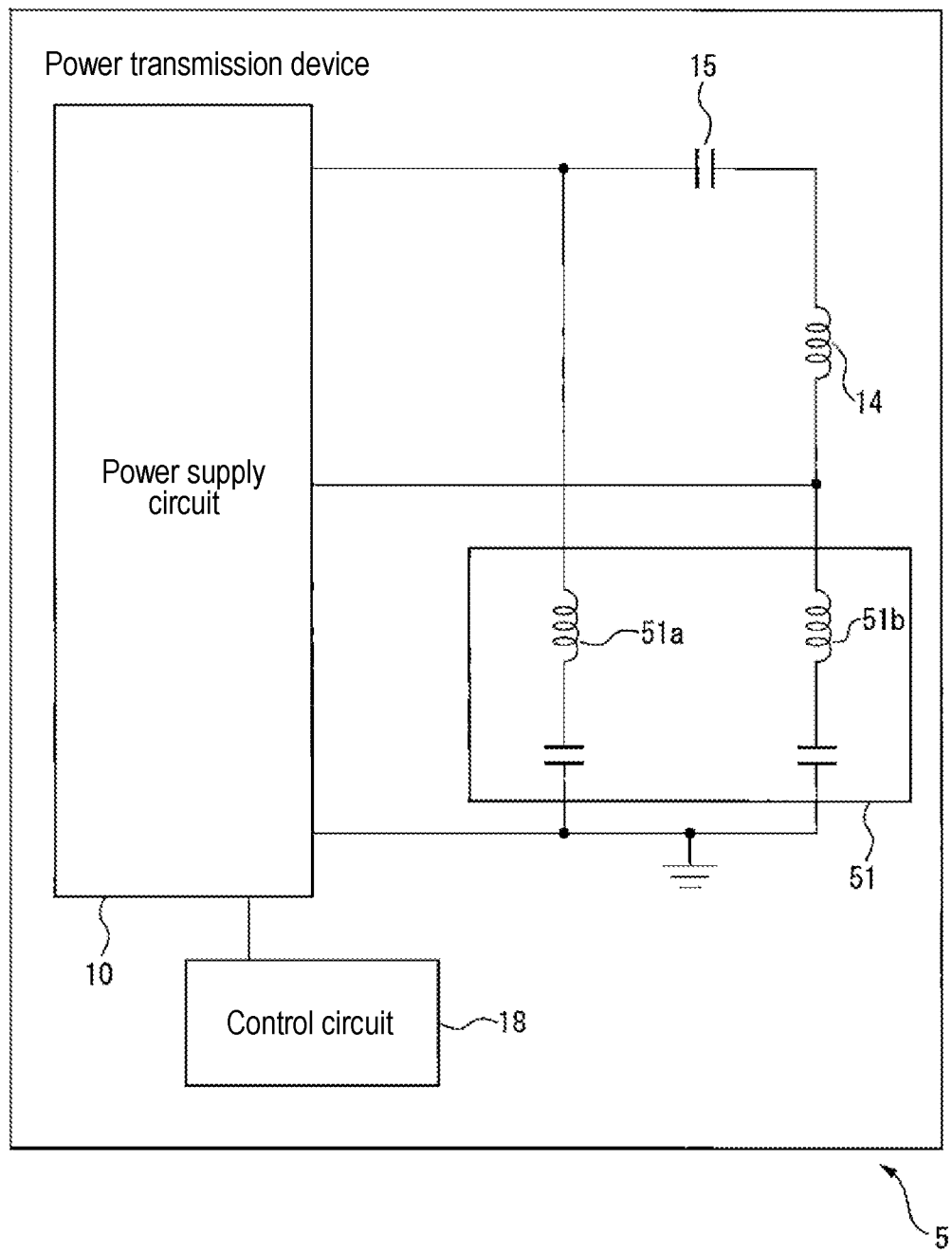
FIG. 7 is a schematic configuration diagram illustrating a power transmission device according to another modified example.

FIG. 7 is a schematic configuration diagram of a power transmission device according to this modified example. Note that, for the sake of simplicity, details of a power supply circuit 10, and illustration of a magnetic field detection element 17 and each gate driver are omitted in FIG. 7. As compared with the power transmission device 2 shown in FIG. 1, a power transmission device 5 according to this modified example is different in that a phase control circuit 51 is provided. Therefore, the phase control circuit 51 and related parts will be described below. For other components of the power transmission device 5, refer to the description of the corresponding components in the above embodiment.

The phase control circuit 51 has, at both ends of a transmission coil 14, respectively, LC series circuits 51a and 51b having one end connected to the transmission coil 14 (or a capacitor 15) and another end being grounded. This allows the phase control circuit 51 to delay the phase of the current flowing through the transmission coil 14 with respect to a phase of a voltage applied to the transmission coil 14. Therefore, the power transmission device 5 can cause the power supply circuit 10 and the transmission coil 14 to perform soft switching.

Note that, for each of the LC series circuits 51a and 51b, the phase control circuit 51 may further have n pieces of capacitor (n is an integer of 2 or more) connected in parallel with each other, and a switching element such as a MOSFET connected in series with each of the (n−1) pieces of capacitor among the n pieces of capacitor. Then, the power transmission device 5 may further have a current-side measurement circuit configured to measure a current flowing through the transmission coil 14. In this case, by switching on/off of a switching element of each of the LC series circuits 51a and 51b when a peak value of a current flowing through the transmission coil 14 measured by the current-side measurement circuit becomes larger than a predetermined threshold value, a control circuit 18 can control an amount of phase delay of the current flowing through the transmission coil 14 with respect to the phase of the voltage applied to the transmission coil 14. Therefore, even if a coupling degree between the transmission coil 14 and a reception coil 21 changes, and a switching frequency and a voltage of AC power supplied to the transmission coil 14 change in accordance with the change, the power transmission device 5 can continue the soft switching operation by the power supply circuit 10 and the transmission coil 14.

Further, in the above embodiment or each modified example, on the basis of a change over time in a strength of the magnetic field detected by the magnetic field detection element 17, the control circuit 18 of the power transmission device may control only one of a switching frequency or a voltage of AC power supplied to the transmission coil 14. For example, the switching frequency of the AC power supplied to the transmission coil 14 may be simply set to a frequency optimized for an expected minimum value of a coupling degree between the transmission coil 14 and the reception coil 21. In this case, even if the coupling degree is higher than the expected minimum value, and consequently the switching frequency of the AC power supplied to the transmission coil 14 is not optimal, an amount of electric power transmitted from the transmission coil 14 to the reception coil 21 can be greater than when the coupling degree is minimum. Therefore, the control circuit 18 can improve power transmission efficiency by controlling the voltage of the AC power supplied to the transmission coil 14 so as to lengthen a magnetic field fluctuation cycle T, without changing the switching frequency of the AC power supplied to the transmission coil 14. Similarly, the voltage of the AC power supplied to the transmission coil 14 may be set to a voltage optimized with any value within a range of an expected coupling degree between the transmission coil 14 and the reception coil 21. In this case, the control circuit 18 controls the switching frequency of the AC power supplied to the transmission coil 14 so as to lengthen the magnetic field fluctuation cycle T, without changing the voltage of the AC power supplied to the transmission coil 14. As a result, although the switching frequency is not the optimum frequency, a ratio of a period during which the resonance suppression coil 30 is short-circuited in the magnetic field fluctuation cycle T can be reduced. Therefore, the control circuit 18 can improve the power transmission efficiency.

According to yet another modified example, in a power transmission device 2, a power supply circuit configured to supply AC power to a transmission coil 14 may have a circuit configuration different from that of the above embodiment, as long as the circuit can variably adjust a switching frequency and a voltage applied to the transmission coil 14. Further, as described above, when only one of a switching frequency or a voltage applied to the transmission coil 14 is controlled, the power supply circuit may be a circuit configured to variably adjust only one of them.

Further, the non-contact power feeding device according to the above embodiment or each modified example may be operated in accordance with the SS system. That is, the resonant circuit including the transmission coil 14 and the capacitor 15 of the power transmission device 2 may have an inductance of the transmission coil 14 and a capacitance of the capacitor 15 set so as to resonate at any frequency within an adjustment range of the switching frequency of AC power supplied from the power supply circuit to the transmission coil 14.

As described above, those skilled in the art can make various changes within the scope of the present invention according to the embodiment.

DESCRIPTION OF SYMBOLS 1 non-contact power feeding device
2, 5 power transmission device
10 power supply circuit
power source
12 power-factor improving circuit
13-1-13-4 switching element
14 transmission coil
14a winding wire
14b projecting core
14c pot core
15 capacitor
16-1, 16-2 gate driver
17 magnetic field detection element
18 control circuit
3, 4 power reception device
20 resonant circuit
21 reception coil
22 capacitor 23 rectifier smoothing circuit
24 full-wave rectifier circuit
25 smoothing capacitor
26 load circuit
27 voltage detection circuit
28 switching element
29 determination circuit
30 resonance suppression coil
31 switch circuit
rectifier circuit
phase control circuit
51a, 51b LC series circuit

The invention claimed is:
1. A non-contact power feeding device comprising a power transmission device and a power reception device to which electric power is transmitted from the power transmission device in a non-contact manner, wherein
the power transmission device comprises:
a transmission coil configured to supply electric power to the power reception device;
a power supply circuit configured to supply alternating current power to the transmission coil, and adjust at least one of a switching frequency or a voltage of alternating current power supplied to the transmission coil;
a magnetic field detector configured to detect a strength of a magnetic field generated from the transmission coil; and
a control circuit configured to control the at least one of the switching frequency or the voltage of the alternating current power supplied from the power supply circuit to the transmission coil, based on a change over time in the strength of the magnetic field detected by the magnetic field detector,
the power reception device comprises:
a resonant circuit comprising a reception coil configured to receive electric power from the power transmission device, and a resonant capacitor connected in series with the reception coil;
a rectifier circuit configured to rectify electric power received via the resonant circuit;
a resonance suppression coil arranged to be electromagnetically coupled to the reception coil:
a switch circuit connected to the resonance suppression coil and configured to switch between short-circuiting and opening of the resonance suppression coil:
a voltage detection circuit configured to measure an output voltage of electric power outputted from the rectifier circuit to obtain a measured value of the output voltage; and
a determination circuit configured to control the switch circuit to short-circuit the resonance suppression coil in response to the measured value of the output voltage being equal to or larger than a first upper-limit threshold value, and control the switch circuit to open the resonance suppression coil in response to the measured value of the output voltage being equal to or lower than a first lower-limit threshold value that is lower than the first upper-limit threshold value,
the magnetic field detector is provided inside a winding wire of the transmission coil on a plane orthogonal to a winding axis of the winding wire of the transmission coil, and
the control circuit of the power transmission device controls the voltage of the alternating current power supplied from the power supply circuit to the transmission coil, to lengthen a fluctuation cycle of the strength of the magnetic field.

2. The non-contact power feeding device according to claim 1, wherein the control circuit of the power transmission device searches for a switching frequency at which the fluctuation cycle of the strength of the magnetic field becomes minimum, the switching frequency being of the alternating current power supplied from the power supply circuit to the transmission coil, and the control circuit controls a voltage of the alternating current power supplied from the power supply circuit to the transmission coil to lengthen the fluctuation cycle of the strength of the magnetic field, in response to the alternating current power with the switching frequency at which the fluctuation cycle of the strength of the magnetic field becomes minimum being supplied to the transmission coil.

3. The non-contact power feeding device according to claim 1, wherein, when power supply from the power transmission device to the power reception device is started, or in a case where a length of a period during which the resonance suppression coil is opened is longer than a predetermined period, the determination circuit of the power reception device controls the switch circuit to short-circuit the resonance suppression coil in response to the measured value of the output voltage being equal to or larger than a second upper-limit threshold value that is lower than the first upper-limit threshold value, and the determination circuit controls the switch circuit to open the resonance suppression coil in response to the measured value of the output voltage being equal to or lower than a second lower-limit threshold value that is lower than the second upper-limit threshold value.

4. A non-contact power feeding device comprising a power transmission device and a power reception device to which electric power is transmitted from the power transmission device in a non-contact manner, wherein
the power transmission device comprises:
a transmission coil configured to supply electric power to the power reception device;
a power supply circuit configured to supply alternating current power to the transmission coil, and adjust at least one of a switching frequency or a voltage of alternating current power supplied to the transmission coil;
a magnetic field detector configured to detect a strength of a magnetic field generated from the transmission coil; and
a control circuit configured to control the at least one of the switching frequency or the voltage of the alternating current power supplied from the power supply circuit to the transmission coil, based on a change over time in the strength of the magnetic field detected by the magnetic field detector,
the power reception device comprises:
a resonant circuit comprising a reception coil configured to receive electric power from the power transmission device, and a resonant capacitor connected in series with the reception coil;
a rectifier circuit configured to rectify electric power received via the resonant circuit;
a resonance suppression coil arranged to be electromagnetically coupled to the reception coil; and
a second rectifier circuit connected between the resonance suppression coil and the smoothing capacitor, and configured to output electric power according to a voltage generated in the resonance suppression coil to the smoothing capacitor, in response to a voltage obtained by rectifying a voltage generated in the resonance suppression coil being higher than a voltage between both terminals of the smoothing capacitor, the rectifier circuit of the power reception device comprises a smoothing capacitor configured to smooth a voltage outputted from the rectifier circuit, and the control circuit of the power transmission device controls the voltage of the alternating current power supplied from the power supply circuit to the transmission coil, to lengthen a fluctuation cycle of the strength of the magnetic field.

5. The non-contact power feeding device according to claim 4, wherein the control circuit of the power transmission device searches for a switching frequency at which the fluctuation cycle of the strength of the magnetic field becomes minimum, the switching frequency being of the alternating current power supplied from the power supply circuit to the transmission coil, and the control circuit controls a voltage of the alternating current power supplied from the power supply circuit to the transmission coil to lengthen the fluctuation cycle of the strength of the magnetic field, in response to the alternating current power with the switching frequency at which the fluctuation cycle of the strength of the magnetic field becomes minimum being supplied to the transmission coil.

6. A non-contact power feeding device comprising a power transmission device and a power reception device to which electric power is transmitted from the power transmission device in a non-contact manner, wherein the power transmission device comprises:

a transmission coil configured to supply electric power to the power reception device;

a power supply circuit configured to supply alternating current power to the transmission coil, and adjust at least one of a switching frequency or a voltage of alternating current power supplied to the transmission coil:

a magnetic field detector configured to detect a strength of a magnetic field generated from the transmission coil; and a control circuit configured to control the at least one of the switching frequency or the voltage of the alternating current power supplied from the power supply circuit to the transmission coil, based on a change over time in the strength of the magnetic field detected by the magnetic field detector, the power reception device comprises:

a resonant circuit comprising a reception coil configured to receive electric power from the power transmission device, and a resonant capacitor connected in series with the reception coil;

a rectifier circuit configured to rectify electric power received via the resonant circuit;

a resonance suppression coil arranged to be electromagnetically coupled to the reception coil; and a second rectifier circuit connected between the resonance suppression coil and the smoothing capacitor, and configured to output electric power according to a voltage generated in the resonance suppression coil to the smoothing capacitor, in response to a voltage obtained by rectifying a voltage generated in the resonance suppression coil being higher than a voltage between both terminals of the smoothing capacitor, the magnetic field detector is provided inside a winding wire of the transmission coil on a plane orthogonal to a winding axis of the winding wire of the transmission coil, the rectifier circuit of the power reception device comprises a smoothing capacitor configured to smooth a voltage outputted from the rectifier circuit, and the control circuit of the power transmission device controls the voltage of the alternating current power supplied from the power supply circuit to the transmission coil, to lengthen a fluctuation cycle of the strength of the magnetic field.

7. The non-contact power feeding device according to claim 6, wherein the control circuit of the power transmission device searches for a switching frequency at which the fluctuation cycle of the strength of the magnetic field becomes minimum, the switching frequency being of the alternating current power supplied from the power supply circuit to the transmission coil, and the control circuit controls the voltage of the alternating current power supplied from the power supply circuit to the transmission coil to lengthen the fluctuation cycle of the strength of the magnetic field, in response to the alternating current power with the switching frequency at which the fluctuation cycle of the strength of the magnetic field becomes minimum being supplied to the transmission coil.

* * * * *